United States Patent
Tu et al.

(10) Patent No.: US 7,607,001 B2
(45) Date of Patent: Oct. 20, 2009

(54) MEMORY MANAGEMENT METHOD FOR SIMULTANEOUSLY LOADING AND EXECUTING PROGRAM CODES

(75) Inventors: Li-Chun Tu, Taipei (TW); Ping-Sheng Chen, Chia-Yi Hsien (TW)

(73) Assignee: Mediatek Incorporation, Hsin-Chu, Hsien (TW)

( * ) Notice: Subject to any disclaimer, the term of this patent is extended or adjusted under 35 U.S.C. 154(b) by 663 days.

(21) Appl. No.: 10/905,304

(22) Filed: Dec. 27, 2004

(65) Prior Publication Data

US 2005/0144364 A1 Jun. 30, 2005

(30) Foreign Application Priority Data

Dec. 30, 2003 (TW) .............................. 92137489 A

(51) Int. Cl.
*G06F 9/00* (2006.01)
(52) U.S. Cl. ................... 713/1; 713/2; 713/100; 711/154; 710/22; 710/23

(58) Field of Classification Search ............ 713/1, 713/2, 100; 711/154; 710/22, 23
See application file for complete search history.

(56) References Cited

U.S. PATENT DOCUMENTS

| 4,635,193 | A * | 1/1987 | Moyer et al. ................... 714/34 |
| 4,636,174 | A * | 1/1987 | Andersen et al. ............. 434/335 |
| 6,799,269 | B2 * | 9/2004 | Dowling ..................... 712/244 |
| 7,380,114 | B2 * | 5/2008 | Sane et al. ....................... 713/2 |
| 2002/0138702 | A1 * | 9/2002 | Gefen et al. ................ 711/154 |
| 2004/0044645 | A1 * | 3/2004 | Palumbo et al. ................ 707/1 |
| 2004/0230784 | A1 * | 11/2004 | Cohen ........................... 713/1 |

* cited by examiner

*Primary Examiner*—Abdelmoniem Elamin
(74) *Attorney, Agent, or Firm*—Winston Hsu

(57) ABSTRACT

A method is provided for simultaneously loading and executing program code in a circuit system. The circuit system includes a plurality of memory devices, a microprocessor, and a loading circuit. The method includes dividing the program code into a plurality of code divisions and utilizing the microprocessor to execute at least a code division when the loading circuit loads any other code division into a memory device of the plurality of memory devices.

19 Claims, 7 Drawing Sheets

MEMORY MANAGEMENT METHOD FOR SIMULTANEOUSLY LOADING AND EXECUTING PROGRAM CODES

BACKGROUND OF INVENTION

1. Field of the Invention

The present invention relates to a method for simultaneously loading and executing program code in a circuit system, and more particularly, to a method which utilizes a microprocessor to execute a specific code division for handling a related control operation when loading program code into a memory device.

2. Description of the Prior Art

Flash memory has been widely used in computer systems and in many portable electrical devices. Regarding the different kinds of flash memories, serial flash memory is smaller than parallel flash memory. Additionally, in the same storing density, the serial flash memory has a reduced pin count. As a result of its small size, low power consumption, and low cost of packaging, the serial flash memory can be utilized to accomplish higher-density storing mediums with lower cost so that the serial flash memory has become an ideal solution for users or designers to store data and program code in optical storing systems.

When utilizing the serial flash memory in a normal circuit system, the data and program code stored in the serial flash memory are first loaded into a DRAM, and are then executed by the related processor. Please refer to FIG. 1, which is a functional block diagram of utilizing a serial flash memory in a circuit system 10 according to a prior art. The circuit system 10 further comprises a microprocessor 12, a DRAM 16, and a loading circuit 18. In the procedure of starting the circuit system 10, the serial flash memory 14 can be used for storing a program code of the circuit system 10, and the program code can be a BIOS (basic input/output system). The BIOS comprises the drivers of devices in the circuit system 10, operating system, and basic functions related to testing and starting loaded programs to ensure that the basic devices in the circuit system 10 work properly after the circuit system starts. The microprocessor 12 can start the circuit system 10 smoothly and access the related signals of peripheral devices through this basic program code. After power is turned on and before the microprocessor starts regular operations, the loading circuit 18 loads the driving programs, testing programs, and operating system stored in the serial flash memory 14 into the DRAM 16 (in a computer system, the DRAM can be regarded as a main memory) for the microprocessor 12 to execute the program code by accessing the DRAM 16 for starting the operating system, and initializing and coordinating the operation of the devices, circuit, and peripheral devices in the circuit system 10.

In recent years, because the complexity of the related firmware is increasing, in the latest circuit systems, the BIOS and related program code are stored in flash read-only memory (flash ROM), which has a larger storing capacity. Because the flash ROM can be directly reprogrammed by the new BIOS and program code and this procedure of reprogramming is basically equivalent to the procedure of updating normal programs, the problems of replacing the hardware devices are eliminated. However, excessive loading of program code can result in substantial loading time into the DRAM 16. Furthermore, as described above, when the power of the circuit system 10 is just started and the BIOS and the related program code have to be loaded into the DRAM 16, the microprocessor 12 sometimes has to quickly respond to signals from different peripheral devices and has to simultaneously detect the capacity of DRAM 16 and the related addresses according to the loading. If every essential control operation is executed after loading all the program codes, no other operation can be executed when loading the program code so that the responding signals between peripheral devices will fail. However, if another hardware circuit is utilized to execute the related control operation, the cost is enormously increased. On the other hand, if the microprocessor 12 simultaneously accesses the uncompleted program code stored in the DRAM 16 for controlling the peripheral devices and the related signal protocols during the time when program code is being loaded into the DRAM 16, the microprocessor may possibly execute incorrect BIOS or program code so that a crash of the circuit system 10 or other errors could occur.

SUMMARY OF INVENTION

It is therefore a primary objective of the claimed invention to provide a method which can utilize a microprocessor to execute a specific code division during loading of program code into a main memory device for handling related control operations to solve the above-mentioned problems.

In the method and structure according to present invention, the program code to be loaded is divided into a plurality of code divisions. The plurality of code divisions comprise at least one specific code division, which can be utilized for the microprocessor to handle the related control operations of the peripheral devices. Therefore, if the specific code division is preloaded or pre-stored in a memory device, when loading the other program codes into the main memory device, the microprocessor can simultaneously execute the specific code division for handling other control operations that have to be completed in a fixed time to avoid operational errors of the circuit system. In the technical characteristic, because the size of the code division related to the peripheral controls is small, the loading time of the code division is short (about 10 ms) so that the microprocessor can operate smoothly almost all the time and the efficiency of the circuit system is improved. Furthermore, when executing the specific code division, the microprocessor according to the present invention can quickly respond to signals from different peripheral devices, detect the capacities of the DRAM and the related status for loading the remaining program code easily. Additionally, the microprocessor quickly completes a decompressing operation when parts of program codes are compressed so that the complexity and the load time of the related loading circuit is reduced.

According to the claimed invention, the present invention provides a method for loading and executing program code in a circuit system. The circuit system comprises a plurality of memory devices, a microprocessor, and a loading circuit; the method comprises dividing the program code into a plurality of code divisions; and when the loading circuit loads a code division into one of the a plurality of memory devices, utilizing the microprocessor to execute any another at least one code division.

Another objective of the present invention is to provide a method for loading and executing a program code in a circuit system, the circuit system comprising a serial flash memory, a memory device, a microprocessor, and a loading circuit, the method comprising: (a) utilizing the serial flash memory to store the program code wherein the program code comprises a first code division and a second code division; (b) utilizing the loading circuit to load the first code division from the serial flash memory into the memory device; (c) utilizing the microprocessor to access the memory device for executing the first code division; and (d) during step (c), utilizing the loading circuit to load the second code division from the serial flash memory into the memory device.

Another objective of the present invention is to provide a method for loading and executing a program code in a circuit system, the circuit system comprising a first memory, a second memory, a third memory, a microprocessor, and a loading circuit, the method comprising: (a) utilizing the first memory device to store the program code wherein the program code comprises a first code division and a second code division; (b) utilizing the loading circuit to load the first code division from the first memory device into the third memory device; (c) during step (b), utilizing the microprocessor to access the third memory device for executing the first code division; and (d) after step (c), utilizing the loading circuit to load the second code division from the first memory device into the second memory device.

Another objective of the present invention is to provide a method for loading and executing a program code in a circuit system, the circuit system comprising a serial flash memory, a first memory device, and a second memory device, a microprocessor, and a loading circuit, the program code comprising a first code division and a second code division, the method comprising: (a) utilizing the serial flash memory to store the second code division; (b) utilizing the second memory device to store the first code division; (c) utilizing the loading circuit to load the second code division from the serial flash memory into the first memory device; and (d) during step (c), utilizing the microprocessor to access the second memory for executing the first code division.

DETAILED DESCRIPTION

Figure 1:
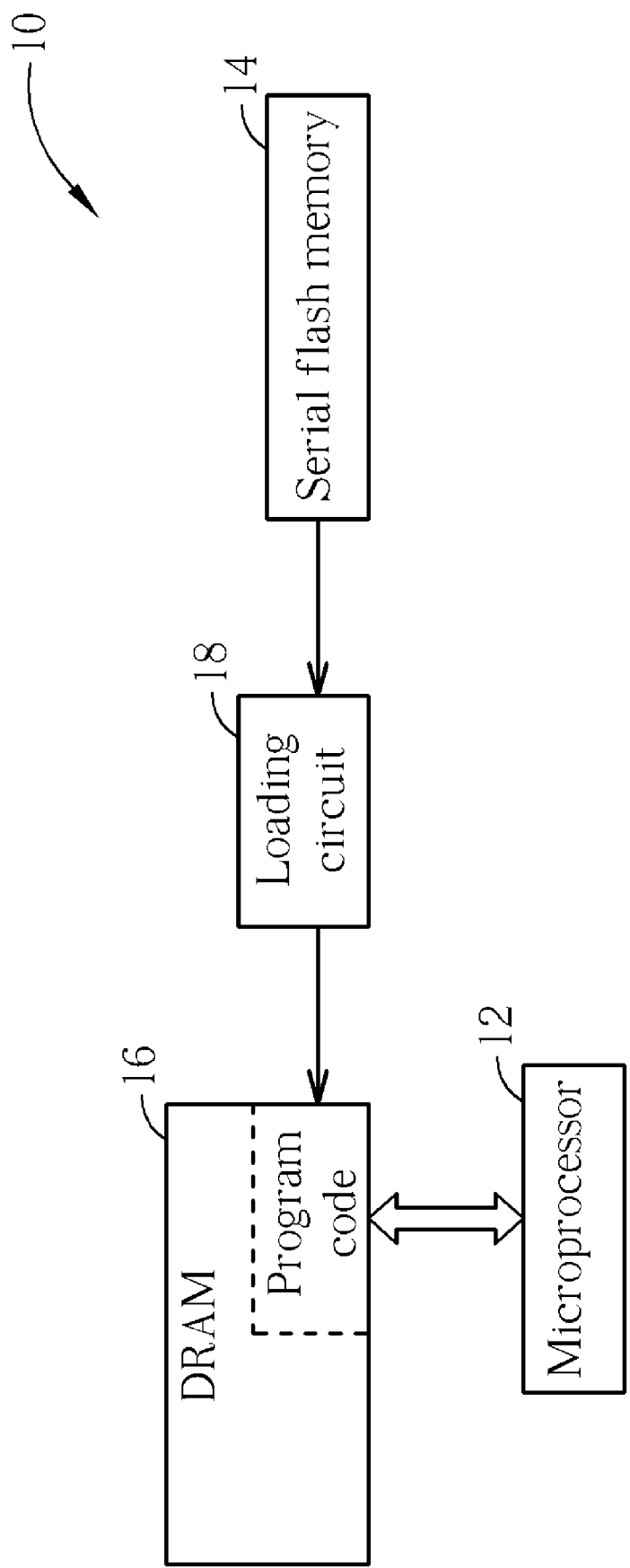
FIG. 1 is a functional block diagram of a circuit system according to the prior art.

The method according to the present invention involves dividing a specific code division from the system's program code (such as the BIOS and the related program code shown in FIG. 1). The size of the specific code division is small, and the specific code division is provided to the microprocessor to handle the related control operations. Regarding this technical characteristic, during a circuit system starts, the specific code division is preloaded into a memory or pre-stored in a memory device. At this time, the remaining program code is still continuously being loaded into a memory device (such as the DRAM 16 in FIG. 1), and the microprocessor can simultaneously access and execute the specific code division to complete related control operations. The method mentioned above can be used in a circuit system having a serial flash memory or any other type of memory for utilization in the situation of loading the program codes and starting the power in the circuit system.

Figure 2:
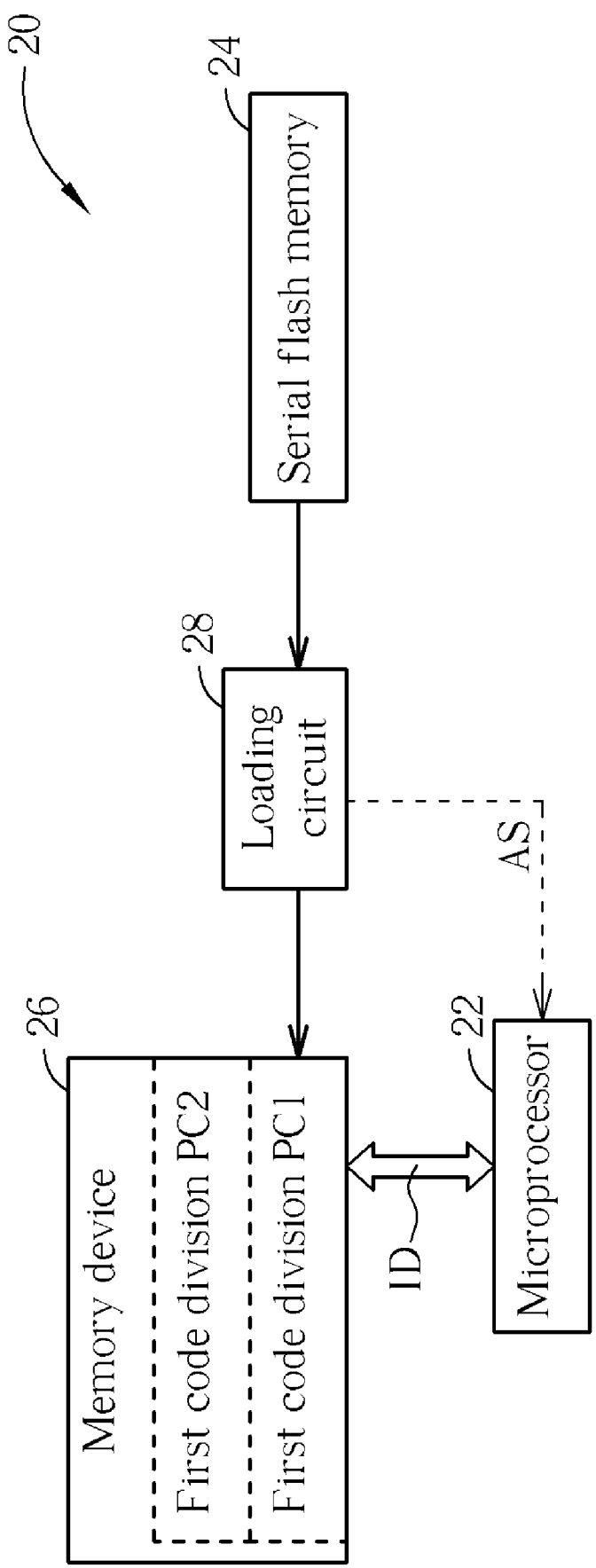
FIG. 2 is a functional block diagram of a circuit system according to a first embodiment of the present invention.

Please refer to FIG. 2, which is a functional block diagram of a circuit system according to a first embodiment of the present invention. FIG. 2 emphasizes the application of the serial flash memory. The circuit system 20 comprises a serial flash memory 24, a memory device 26, a microprocessor 22, and a loading circuit 28. The memory device 26 can be accomplished by using a DRAM or similar device. The serial flash memory 24 stores program code and is electrically connected to the loading circuit 28. For example, after power is turned on and before the microprocessor 22 starts to execute each operation, the loading circuit 28 loads the program code that can be used for driving, testing, and controlling the circuit system 20 stored in the serial flash memory 24 into the memory device 26 for the microprocessor 22 to execute.

The program code that is to be loaded is divided into a plurality of code divisions, which comprise at least one specific code division that directly relates to the control operations of the microprocessor such as functions for executing decompressing, and detecting the memory device 26, and quickly responding to signals between different peripheral devices. In this embodiment, the program code comprises a first code division PC1 and a second code division PC2, where the first code division PC1 is the specific code division mentioned above. According to the structure of this embodiment, the loading circuit 28 is also electrically connected to the memory device 26, and the memory device 26 can communicate with the microprocessor 22 through an interface ID. Using this technical characteristic, the loading circuit 28 first loads the first code division PC1 from the serial flash memory 24 into the memory device 26. Because the size of the first code division is small, the first code division can be loaded in a very short time (about 10 ms). This allows the microprocessor 22 to access the memory device 26 to execute the first code division PC1 as quickly as possible after the first code division has been loaded. At the same time, after the first code division is loaded, the loading circuit 28 continuously loads the second code division PC2 from the serial flash memory 24 into the memory device 26. The microprocessor 22 can execute the first code division PC1 for handling other control operations that must be completed in a fixed time. This increases the efficiency of the circuit system 20 and reduces the starting time of the circuit system 20, in addition to ensuring the accuracy of operations in the circuit system 20.

In the actual implementation, the program code is not necessarily limited to be divided into two code divisions. In fact, the program code can be divided into more code divisions and the loading order of the code divisions can be changed. Additionally, after the loading circuit completely loads the first code division PC1 into the memory device 26, the loading circuit 28 sends a completion signal AS to the microprocessor 22 for indicating that the microprocessor 22 can access the memory device 26 to start executing the first code division PC1.

Figure 3:
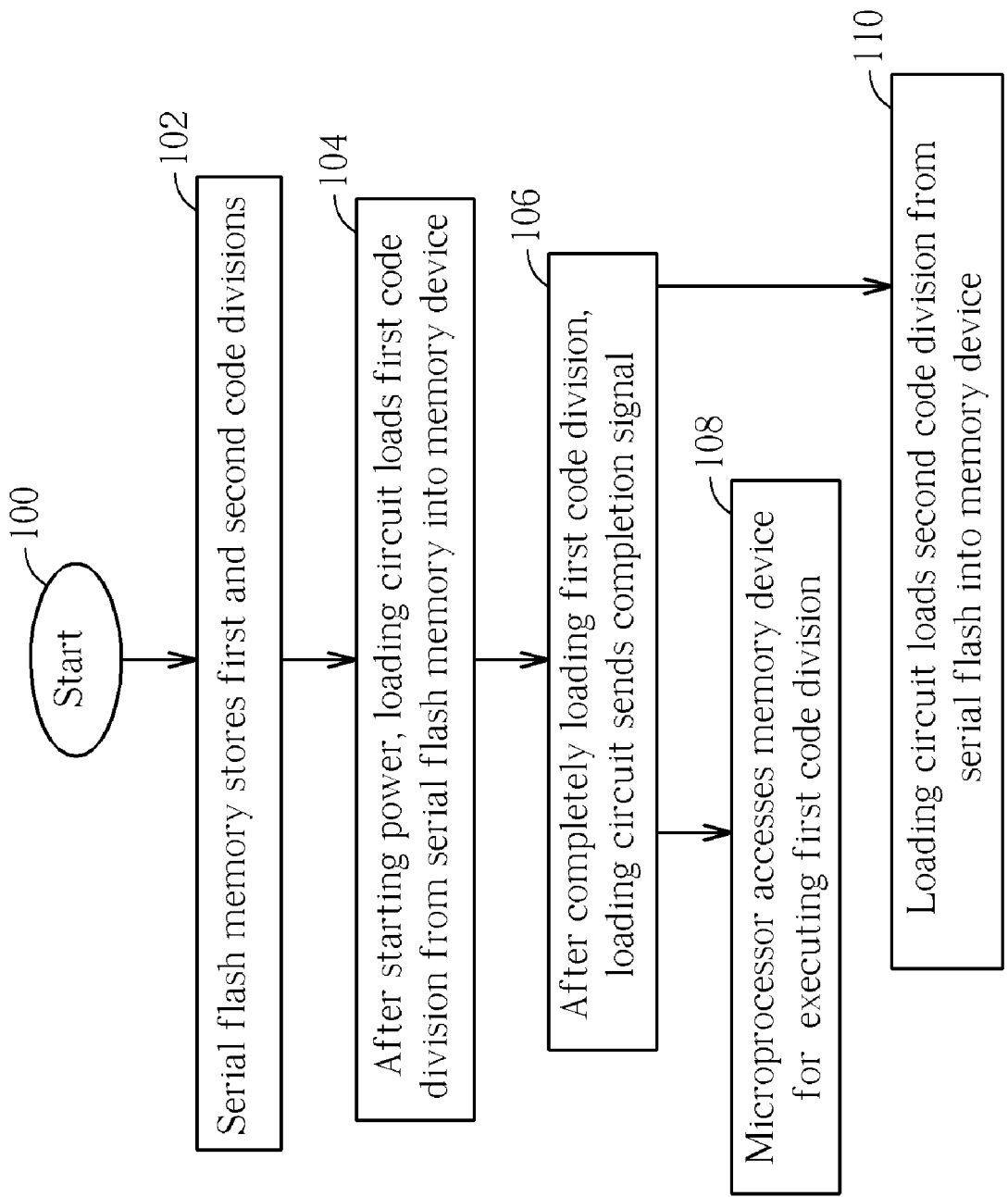
FIG. 3 is a flow chart of an implementation based on FIG. 2 according to the present invention.

The circuit system 20 according to the present invention can be a computer system, and the program code can be starting program code (such as BIOS). Based on the circuit system 20 of the embodiment shown in FIG. 2, the method for simultaneously loading and executing program codes is shown in FIG. 3, which is a flowchart of an implementation according to the present invention and comprises the following steps:

Step 100: Start.

Step 102: Before transferring the program code or starting power, the serial flash memory 24 stores the program code.

The program code comprises a first code division PC1 and a second code division PC2, and the first code division is directly related to the control operations of microprocessor 22.

Step 104: After starting power and before the microprocessor 22 starts to execute any operations, the loading circuit 28 loads the first code division PC1 from the serial flash memory 24 into the memory device 26.

Step 106: After the loading circuit 28 loads the first code division into the memory device 26, the loading circuit 28 sends the completion signal AS to the microprocessor 22 for informing the microprocessor 22 that the first code division PC1 is completely stored in the memory device 26. Simultaneously proceed to step 108 and step 110.

Step 108: The microprocessor 22 accesses the memory device 26 for executing the first code division PC1. The microprocessor 22 can quickly respond to the signals between the peripheral devices, detect the status of the memory device 26 according to the first code division, and ensure the remaining program code (the second code division PC2) is correctly loaded into the memory device 26. Furthermore, in this embodiment, the first code division PC1 can be designed as uncompressed program code and the second code division can be designed as compressed program code. Therefore, the microprocessor 22 can execute the first code division PC1 to decompress the second code division PC2. Firstly, this means the decompressing operation is not needed to be performed by the hardware (loading circuit 28) so that the complexity and the loading of the loading circuit 28 are reduced; secondly, the size of the second code division PC2 and the time consumption of loading the second code division are reduced.

Step 110: Loading circuit 28 continuously loads the second code division PC2 from the serial flash memory 24 into the memory device 26 for microprocessor 22 to initialize and coordinate the operation of every device, circuit, peripheral device and complete the starting of the circuit system 20 through accessing and executing the complete program code.

Figure 4:
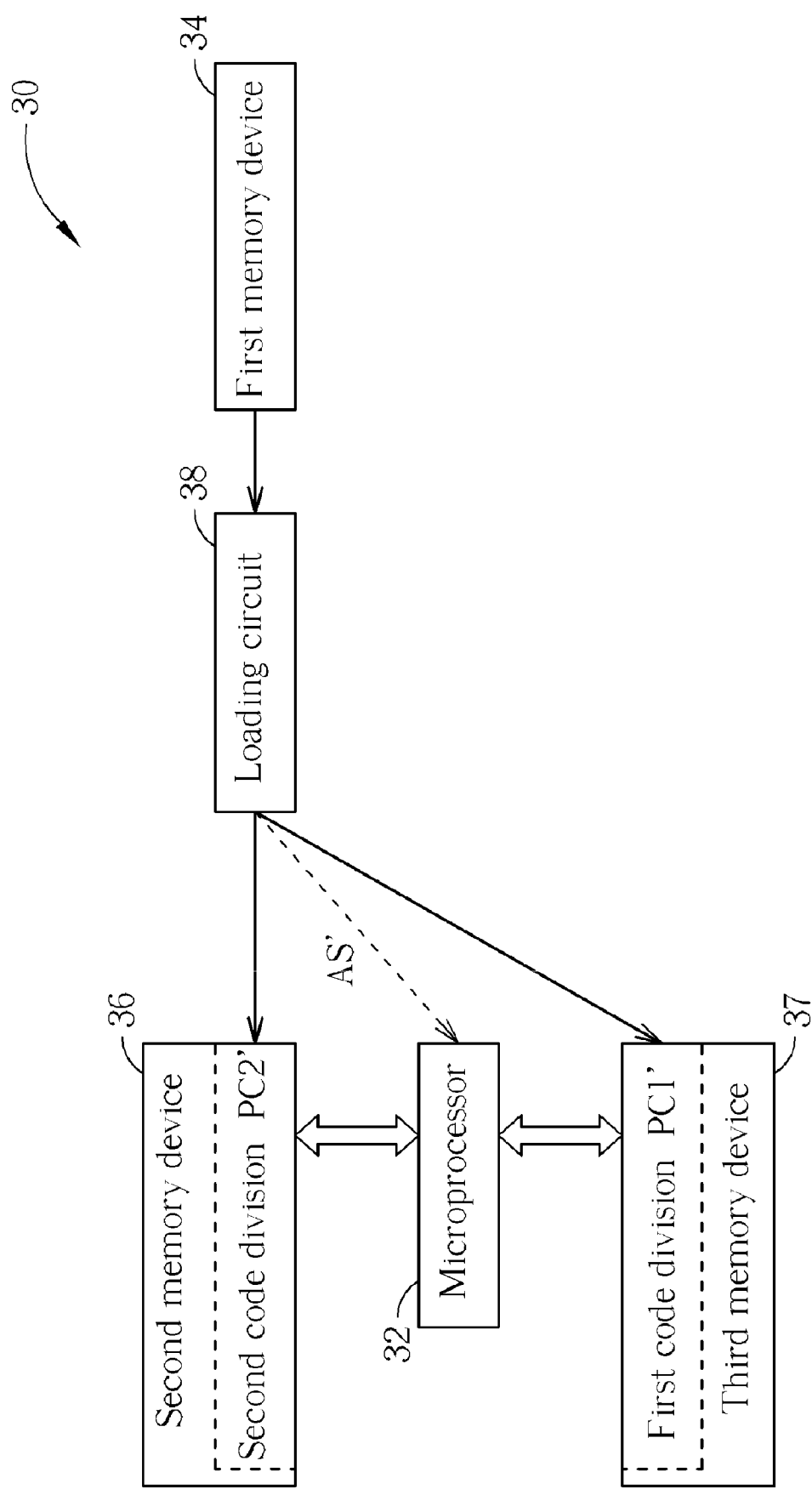
FIG. 4 is a functional block diagram of another circuit system according to a second embodiment of the present invention.

In the above-mentioned structure in FIG. 2, the memory device 26 is implemented using a DRAM. When the loading circuit 28 and the microprocessor 22 simultaneously load and read/write the DRAM (memory device 26), the loading time relates to the accessing speed of a DRAM. For improvement, please refer to FIG. 4, which is a functional block diagram of another circuit system 30 according to a second embodiment of the present invention. FIG. 4 emphasizes that an additional memory device is set up for storing a specific program code. The circuit system 30 comprises a first memory device 34, a second memory device 36, a third memory device 37, a microprocessor 32, and a loading circuit 38. The function of the first memory device 34 corresponds to the serial flash memory 24 in FIG. 2 that is used for storing program code for starting the circuit system 30. But in this embodiment, the first memory device 34 is not limited to be implemented using serial flash memories, instead, parallel flash memories or the similar devices could be used. The first memory device 34 is electrically connected to the loading circuit 38, and the loading circuit 38 is electrically connected to the second memory device 36 and the third memory device 37. The second memory device 36 corresponds to the memory device 26 in FIG. 2 that can be implemented using a DRAM or the like, and the third memory device 37 is an important technical characteristic of this embodiment that can be implemented using an SRAM or a buffer. After starting the power and before the microprocessor 32 starts to execute any operations, the loading circuit 38 respectively loads the program code used for driving, testing, and controlling the circuit system 30 stored in the first memory device 34 into the related memories (the second memory device 36 and the third memory device 37).

The program codes are divided into a first code division PC1' and a second code division PC2' and the first code division PC1' is still set to be directly related to each control operation of the circuit system. The loading circuit 38 first loads the first code division PC1' from the first memory device 34 into the third memory 37. Because the size of the first code division PC1' is small, the capacity of the additional third memory device 37 is configured to ensure the third memory device can store the predetermined first code division PC1'. Following the above example, the loading time can be a very short time (about 10 ms) so that the microprocessor 32 can access the third memory device 37 for executing the first code division PC1' as quickly as possible after the first code division is completely loaded. After the first code division PC1' is completed loaded, the loading circuit 38 sends a completion signal AS' to the microprocessor 32 for indicating that the microprocessor can access the third memory 37 to execute the first code division PC1'. Simultaneously, the loading circuit 38 changes the route of transmission so that the second code division PC2' is loaded into the second memory device 36 instead of the third memory 37. So, when the loading circuit 38 loads the program code into the second memory device 36 (DRAM), the microprocessor 32 simultaneously executes the read/write operations to the third memory device 37 and executes the first code division PC1' for handling other control operations that have to be completed in a fixed time. This avoids that the status of simultaneously loading and reading/writing the DRAM and limits the idling time of microprocessor 32 to a very short time of loading the first code division PC1'.

Figure 5:
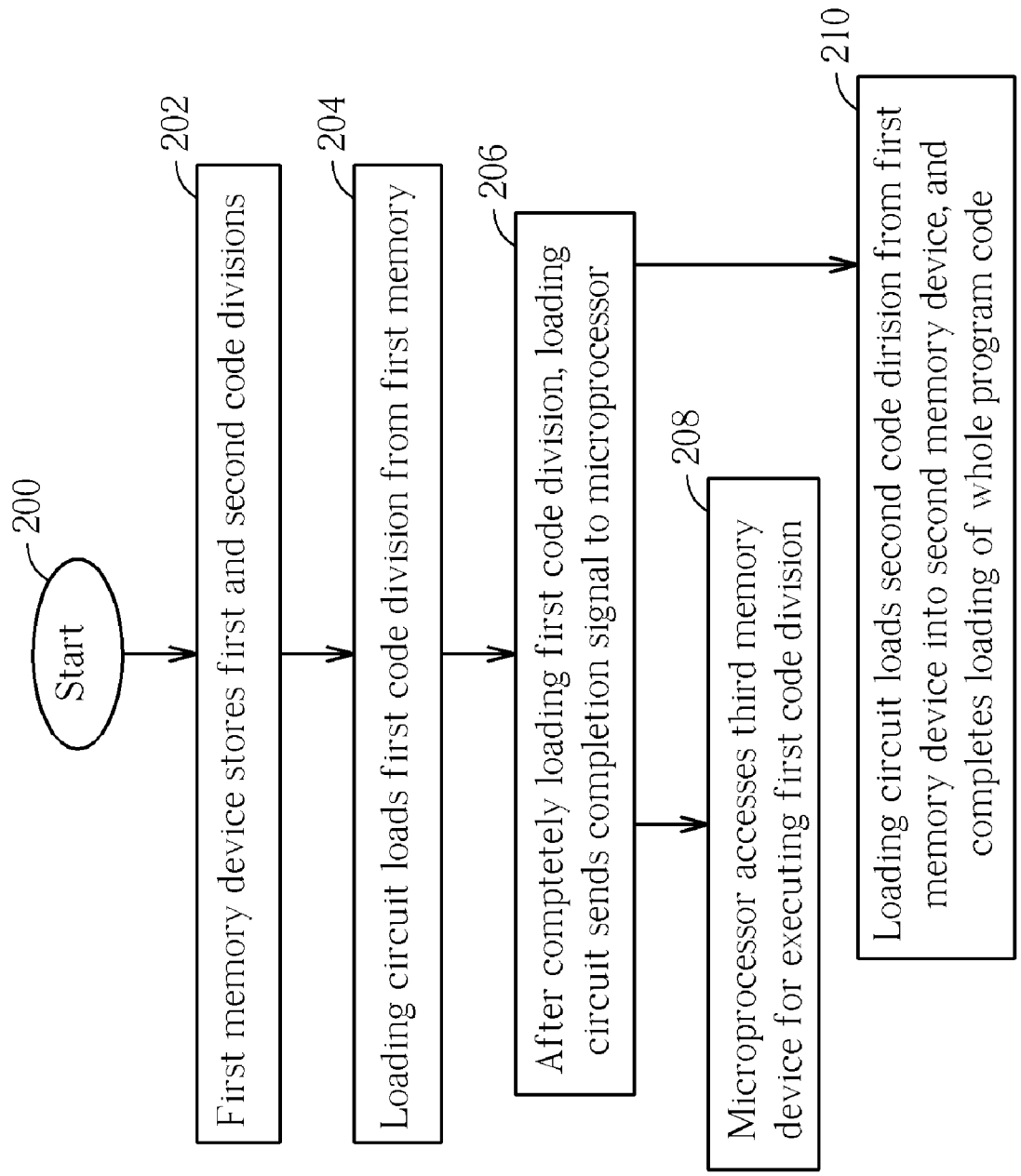
FIG. 5 is a flowchart of an implementation based on FIG. 4 according to the present invention.

During the time that the loading circuit 38 loads the second code division PC2' into the second memory device 36, the microprocessor 32 can quickly respond to signals between different peripheral devices, detect the status of the memory device 26, and even execute the decompressing function for raising the efficiency of the circuit system 30, shortening the starting time of the circuit system 30, and ensuring the accuracy of the operations of the circuit system 30. Because the target memories into which the loading circuit 38 loads the program code and from which the microprocessor 32 executes the read/write operations are different, the microprocessor 32 can efficiently execute the functions of detecting and controlling, and the program code can be transferred more smoothly between the loading circuit 38 and the second memory device 36. Of course, in the circuit system 30 of this embodiment, if a serial flash memory is utilized to accomplish the first memory device 34, the circuit system 30 can also have the advantages of serial flash memories. Please refer to FIG. 5, which is a flowchart of an implementation based on FIG. 4 according to the present invention and comprises following steps:

Step 200: Start.

Step 202: Before transferring the program code or starting the power, the first memory device 34 stores the program code. In this embodiment, the program code comprises a first code division PC1' and a second code division PC2', and the first code division PC1' is directly related to the control operations of the microprocessor 32.

Step 204: After starting power and before the microprocessor 32 starts to execute any operations, the loading circuit 38 first loads the first code division PC1' from the first memory device 34 into the third memory device 37.

Step 206: When the loading circuit 38 completely loads the first code division PC1' into the third memory device 37, the loading circuit 38 sends the completion signal AS' to the microprocessor 32 for indicating that the first code division PC1' is completely stored in the third memory device 37, and then simultaneously proceeds to step 208 and step 210.

Step 208: The microprocessor 32 accesses the third memory device 37 for executing the first code division PC1'. The microprocessor 32 can quickly respond to signals from the peripheral devices, detect the status of the memory device 36 according to the first code division, and ensure the other program code (the second code division PC2') can be correctly loaded into the memory device 36. Furthermore, as in the embodiment mentioned above, the first code division PC1' can be designed as uncompressed program code and the second code division PC2' can be designed as compressed program code. In this way, the microprocessor 32 can execute the first code division PC1' to decompress the second code division PC2'. This is a benefit because the decompressing operation does not need to be accomplished by the hardware (loading circuit 38) so that the complexity and workload of the loading circuit 38 are reduced. Additionally, the space of the second code division PC2' and the time consumption of loading the second code division PC2' are reduced.

Step 210: The loading circuit 38 loads the second code division PC2' from the first memory device 34 into the second device 36 for completing the loading of the whole program code and the starting of the circuit system 30.

Similarly, the program code is not necessarily limited to be divided into two code divisions. In fact, the program code can be divided into more code divisions according to design options. Furthermore, if the second memory device 36 is implemented by a ROM or an EEPROM, the second memory device 36 can be first used for storing the first code division PC1' so that the microprocessor 32 can directly access the second memory device 36 to access the first code division PC1' and further save time loading the first code division PC1'. The first memory device 34 only needs to store the second code division PC2', but doesn't need to store the first code division PC1'.

Figure 6:
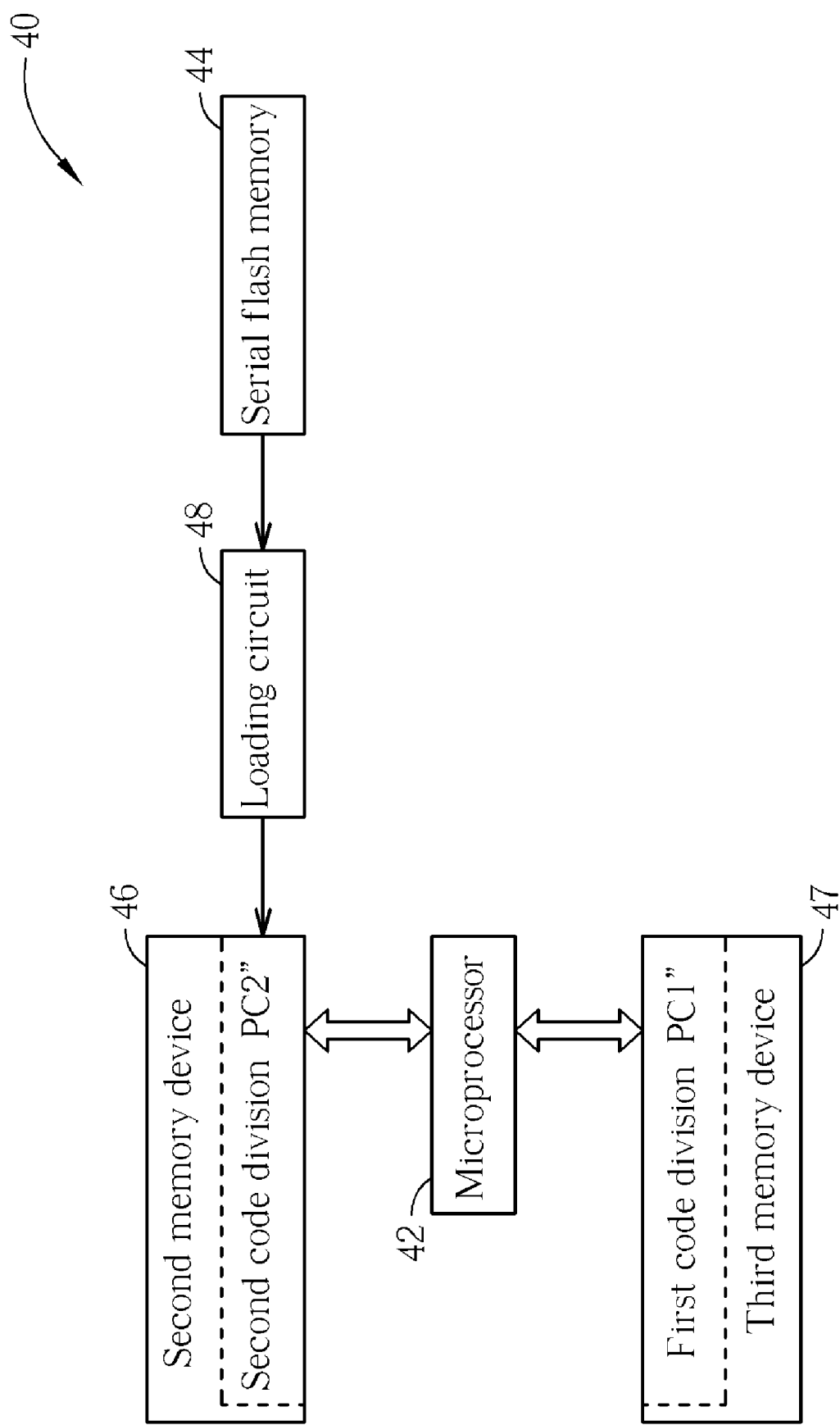
FIG. 6 is a functional block diagram of another circuit system according to a third embodiment of the present invention.

Please refer to FIG. 6, which is a functional block diagram of an embodiment of another circuit system 40. The first memory device 34 in FIG. 4 is implemented using the serial flash memories, and the third memory device 37 is accomplished by the ROMs. Therefore, the circuit system 40 comprises a serial flash memory 44, a second memory device 46, a third memory device, a microprocessor 42, and a loading circuit 48. The technical characteristics of this embodiment is similar to the embodiment in FIG. 4, but the main difference is that the third memory device 47 pre-stores the first code division PC1", and the serial flash memory 44 only stores the second code division PC2". This reduces the needed capacity of the serial flash memory 44, and, at the same time, the loading circuit 48 doesn't need to send any completion signal to the microprocessor 42 and doesn't need to inform the microprocessor 42 that the first code division PC1" has completed loading.

Figure 7:
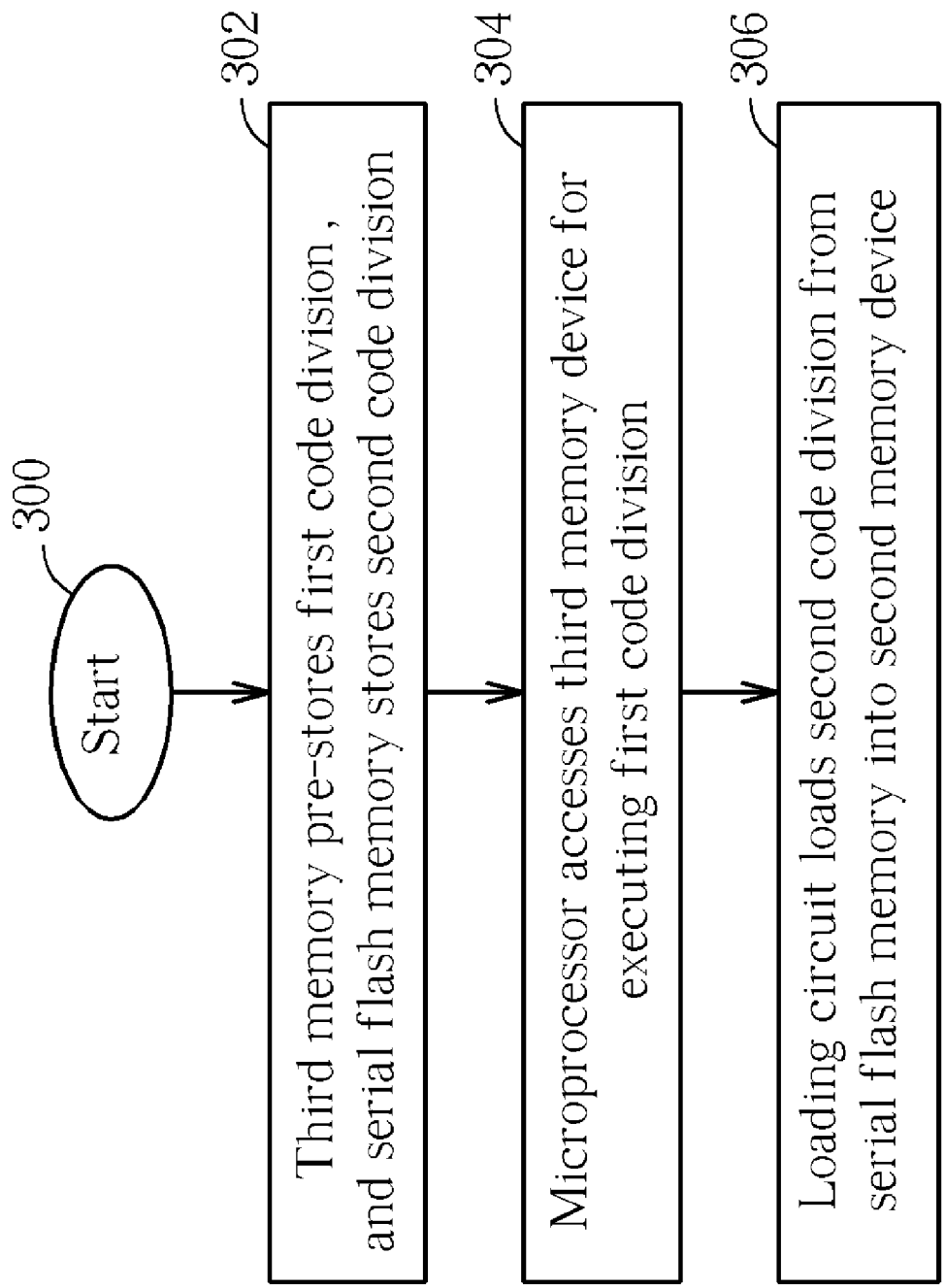
FIG. 7 is a flowchart of an implementation based on FIG. 6 according to the present invention.

Please refer to FIG. 7, which is a flowchart of an implementation based on FIG. 6 according to the present invention. The flowchart in FIG. 7 comprises following steps:

Step 300: Start.

Step 302: The program code in this embodiment comprises a first code division PC1" and a second program code PC2", where the first code division PC1" is directly related to the control operations of the microprocessor 42. Before transferring the program code or starting the power, the third memory device 47 pre-stores the first code division PC1", and the serial flash memory 44 stores the second code division PC2".

Step 304: The microprocessor 42 accesses the third memory device 47 to execute the first code division PC1". The microprocessor 42 can quickly respond to signals from the peripheral devices, detect the status of the memory device 46 according to the first code division, and ensure the other program codes (the second code division PC2") can be correctly loaded into the memory device 46.

Step 306: The loading circuit 48 loads the second code division PC2" from the serial flash memory 44 into the second memory device 46 for completing the loading of program code and the starting of the circuit system 40.

The present invention provides a method for almost simultaneously loading and executing program codes. It allows the microprocessor to achieve the best efficiency of the microprocessor and the circuit system without idling during transferring the program code and starting the power. Additionally, if the functions of detecting the status of the memory device and decompressing are executed by the firmware of the microprocessor according to the specific code division, it can adjust corresponding to different memories for reducing the complexity and the workload of the loading circuit, and for reducing the cost. Furthermore, the advantages of utilizing serial flash memories such as small volume, fewer pin counts, low power consumption, and low cost are added.

Those skilled in the art will readily observe that numerous modifications and alterations of the device may be made while retaining the teachings of the invention. Accordingly, that above disclosure should be construed as limited only by the metes and bounds of the appended claims.

What is claimed is:

1. A method for loading and executing program code in a circuit system, the circuit system comprising a plurality of memory devices, a microprocessor, and a loading circuit, the method comprising:

dividing the program code into a plurality of code divisions; and when the loading circuit loads a code division into one of the memory devices, utilizing the microprocessor to execute at least one other code division;

wherein the program code comprises the at least one other code division and a remaining portion, the remaining portion of the program code comprises the code division, and the remaining portion of the program code is not executed by the microprocessor until the remaining portion of the program code is completely loaded by the loading circuit.

2. The method of claim 1, wherein the plurality of memory devices comprises a serial flash memory and a first memory device, the method further comprising:

utilizing the serial flash memory to store the plurality of code divisions;

utilizing the loading circuit to load the plurality of code divisions into the first memory device from the serial flash; and when the loading circuit loads any one of the code divisions into the first memory device, utilizing the microprocessor to execute at least one code division that has been loaded into the first memory device.

3. The method of claim 2, wherein the first memory device is a DRAM (dynamic random access memory).

4. The method of claim 1, wherein the plurality of memory devices comprises a first memory device, a second memory device, and a third memory device, the method further comprising:

utilizing the first memory device to store the plurality of code divisions;

utilizing the loading circuit to load at least one code division from the first memory device into the third memory device, and then loading the other code divisions from the first memory device into the second device; and when the loading circuit loads at least one code division from the first memory device into the second memory, utilizing the microprocessor execute at least one code division that has been loaded into the third memory device.

5. The method of claim 4, wherein the first memory device is a serial flash or a parallel flash; the second memory device is a DRAM (dynamic random access memory); and the third memory is a SRAM (static random access memory) or a buffer.

6. The method of claim 1, wherein the plurality of memory devices comprises a serial flash, a first memory device, and a second memory device, the method further comprising:

utilizing the second memory device to store at least one code division and utilizing the serial flash memory to store the other code divisions of the plurality of the code divisions;

utilizing the loading circuit to load the code division stored in the serial flash memory into the first memory device; and when the loading circuit loads at least one code division into the first memory device, utilizing the microprocessor to execute at least one code division stored in the second memory device.

7. The method of claim 6, wherein the first memory device is a DRAM (dynamic random access memory), and the second memory device is a ROM (read-only memory) or an EEPROM (electrically erasable programmable read-only memory).

8. A method for loading and executing program code in a circuit system, the circuit system comprising a first memory device, a second memory device, a microprocessor, and a loading circuit, the method comprising:

(a) utilizing the first memory device to store the program code wherein the program code comprises a first code division and a remaining portion and the remaining portion of the program code comprises a second code division;

(b) utilizing the loading circuit to load the first code division from the first memory device into the second memory device;

(c) utilizing the microprocessor to access the second memory device for executing the first code division, wherein the remaining portion of the program code is not executed by the microprocessor until the remaining portion of the program code is completely loaded by the loading circuit; and (d) during step (c), utilizing the loading circuit to load the second code division from the first memory device into the second memory device.

9. The method of claim 8, wherein the first memory device is a serial flash memory, and the second memory device is a DRAM (dynamic random access memory).

10. The method of claim 8, wherein the circuit system is a computer system, the program code is a starting program code designed for controlling starting of the computer system, and the method is utilized when starting the computer system.

11. A method for loading and executing program code in a circuit system, the circuit system comprising a first memory, a second memory, a third memory, a microprocessor, and a loading circuit, the method comprising:

(a) utilizing the first memory device to store the program code wherein the program code comprises a first code division and a remaining portion and the remaining portion of the program code comprises a second code division;

(b) utilizing the loading circuit to load the first code division from the first memory device into the third memory device;

(c) utilizing the microprocessor to access the third memory device for executing the first code division, wherein the remaining portion of the program code is not executed by the microprocessor until the remaining portion of the program code is completely loaded by the loading circuit; and (d) during step (c), utilizing the loading circuit to load the second code division from the first memory device into the second memory device.

12. The method of claim 11, wherein the first memory device is a serial flash or a parallel flash memory; the second memory device is a DRAM (dynamic random access memory); the third memory is a SRAM (static random access memory) or a buffer.

13. The method of claim 11, wherein the circuit system is a computer system, the program code is a starting program code designed for controlling starting of the computer system, and the method is utilized when starting the computer system.

14. A method for loading and executing program code in a circuit system, the circuit system comprising a third memory device, a first memory device, a second memory device, a microprocessor, and a loading circuit, the program code comprising a first code division and a remaining portion, the remaining portion of the program code comprising a second code division, the method comprising:

(a) utilizing the third memory device to store the second code division;

(b) utilizing the second memory device to store the first code division;

(c) utilizing the loading circuit to load the second code division from the third memory device into the first memory device; and (d) during step (c), utilizing the microprocessor to access the second memory device for executing the first code division, wherein the remaining portion of the program code is not executed by the microprocessor until the remaining portion of the program code is completely loaded by the loading circuit.

15. The method of claim 14, wherein the third memory device is a serial flash memory, the first memory device is a DRAM (dynamic random access memory), and the second memory device is a ROM (read-only memory) or an EEPROM (electrically erasable programmable read-only memory).

16. The method of claim 15, wherein the circuit system is a computer system, the program code is a starting program code designed for controlling starting of the computer system, and the method is utilized when starting the computer system.

17. The method of claim 8, wherein the microprocessor starts accessing the second memory device for executing the first code division in step (c) and the loading circuit starts loading the second code division from the first memory device into the second memory device in step (d), simultaneously.

18. The method of claim 11, wherein the microprocessor starts accessing the third memory device for executing the first code division in step (c) and the loading circuit starts loading the second code division from the first memory device into the second memory device in step (d), simultaneously.

19. The method of claim 14, wherein the second memory device pre-stores the first code division without loading the first code division via the loading circuit.

* * * * *